United States Patent [19]

Gormish

[11] Patent Number: 5,910,796
[45] Date of Patent: Jun. 8, 1999

[54] MONITOR GAMMA DETERMINATION AND CORRECTION

[75] Inventor: Michael J. Gormish, Los Altos, Calif.

[73] Assignees: Ricoh Corporation, Menlo Park, Calif.; Ricoh Company, Ltd., Tokyo, Japan

[21] Appl. No.: 08/650,478

[22] Filed: May 20, 1996

[51] Int. Cl.⁶ ................................................. G09G 5/04
[52] U.S. Cl. .......................... 345/153; 358/519; 348/674
[58] Field of Search ................................... 345/147, 150, 345/153, 154, 22; 348/674, 675, 676, 677; 358/518, 519; 364/526

[56] References Cited

U.S. PATENT DOCUMENTS

| 5,155,588 | 10/1992 | Levien | 358/519 |
| 5,381,349 | 1/1995 | Winter et al. | 364/526 |
| 5,483,259 | 1/1996 | Sachs | 345/153 |
| 5,570,108 | 10/1996 | McLaughlin et al. | 345/146 |
| 5,638,117 | 6/1997 | Engeldrum et al. | 345/904 |

FOREIGN PATENT DOCUMENTS

WO 92/20184  11/1992  WIPO .

OTHER PUBLICATIONS

"*Adobe Photoshop Tutorial*" pp. 4–6, Adobe Photoshop version 2.5, Adobe Systems Incorporated, 1993.
"A note on gama correction and images", Graeme W. Gill, May 16, 1993.

*Primary Examiner*—Dennis-Doon Chow
*Attorney, Agent, or Firm*—Blakely, Sokoloff, Taylor & Zafman LLP

[57] ABSTRACT

A computer-implemented method of performing gamma correction for a display device is provided. The display device is capable of displaying images using three color components, such as red, green, and blue. A first color bar image is displayed on the display device. The first color bar image has a constant intensity for two of the color components and a linear scale of intensity along a coordinate axis for the third color component. A second color bar image is also displayed which has a constant intensity for the first two color components and a constant average intensity for the third color component. A user input is then received specifying a location on the first color bar image at which the color of the first color bar image appears to match the overall color of the second color bar image. An estimate of the gamma of the display device is determined based on the location specified by the user input. Next, a correction value is determined based on the estimate of the gamma. The second color bar image is then redisplayed using the correction value, such that the color of the second color bar image is pure gray if the estimate of the gamma was correct. The estimate of the gamma can then be utilized to provide gamma correction for the display device.

22 Claims, 7 Drawing Sheets

MONITOR GAMMA DETERMINATION AND CORRECTION

FIELD OF THE INVENTION

The present invention pertains to the field of electronic display devices used with computer systems, television systems, and the like. More particularly, the present invention relates to the determination and correction of non-linearity for a display device.

BACKGROUND OF THE INVENTION

CRT (cathode ray tube) display devices are generally characterized by a non-linear relationship between the applied input voltage and the output luminance (light intensity) for any given pixel. This relationship can be approximated by the exponential function, luminance= (voltage)^(gamma), where voltage is normalized to one. The relationship is non-linear for many display devices, because gamma is generally not equal to one. As a result, the amount of light emitted from a phosphor on the screen tends to be less than what it should be, given the applied voltage. Hence, an image showing a gradual transition from black to white (a "linear ramp") will generally appear very dark. This effect is well understood. In fact, video cameras are generally designed to output a signal that is "gamma corrected", so that a linear ramp will be displayed as a linear ramp.

For many applications involving image processing, however, the accurate display of images is essential. Accordingly, gamma determination and correction becomes crucial for such applications. Some image processing software applications allow a computer user to enter the gamma of the monitor, so that images can be gamma corrected before display. However, the user must first know the value of the gamma. Graphics arts professionals often use physical instruments to measure the gamma and other monitor characteristics. However, the typical user does not have access to such equipment. Other programs allow a user to adjust the gamma, but the user must still determine the overall gamma correction himself, taking into account any gamma correction that may already be included in the images to be displayed. In addition, such programs often do not allow gamma correction to be performed with high accuracy. What is needed, therefore, is an easy, accurate way for an ordinary user to determine the gamma of a display device without the use of a separate physical measuring device.

SUMMARY OF THE INVENTION

A machine-implemented method of computing non-linearity in an input/output response of a display device is described. The input/output response of the display device is approximated by the equation: luminance=(voltage)^(gamma). In the provided method, a first image and a second image are displayed on the display device. A user input is received which specifies a location on the first image at which the color of the first image matches the color of the second image. The gamma of the display device is then estimated based on the location specified by the user input.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for determining and correcting non-linearity in the input/output response of a display device are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes a procedure which makes use of color and real-time feedback in allowing a user to accurately determine the gamma of a display device such as a computer CRT monitor. In the preferred embodiment, the procedure is embodied by computer program instructions. The instructions can be used to cause a general purpose processor which is programmed with the instructions to perform the procedure of the present invention. Alternatively, the procedure of the present invention might be performed by specific hardware components that contain hard-wired logic for performing the required steps, or by any combination of programmed general purpose computer components and custom hardware components. In one embodiment, which is discussed below, the present application takes the form of software residing in a server computer system that can be accessed over the Internet by a client computer system at a remote location. In such an embodiment, the present invention is presented to a user of the client system in the form of a World Wide Web page.

Figure 1A:
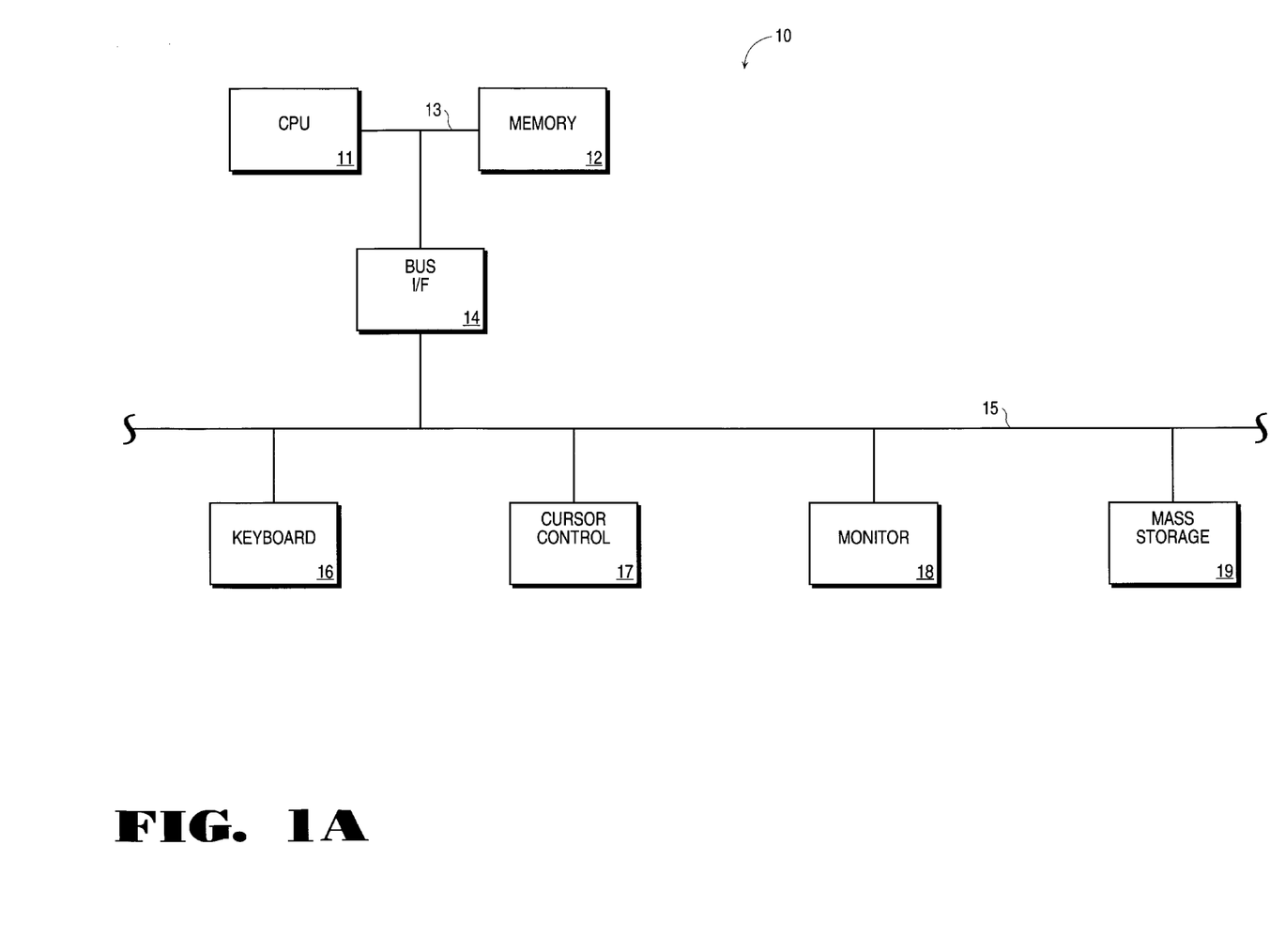
FIG. 1A illustrates a computer system in which the present invention is implemented.

FIG. 1A illustrates a computer system in which the present invention can be implemented. The computer system 10 includes a central processing unit (CPU) 11 coupled to system memory 12 by a system bus 13. The system bus 13 is coupled to a peripheral bus 15, which may be a PCI (Peripheral Component Interconnect) bus or the like, via a bus interface 14. Connected to the peripheral bus 15 are various input/output devices, including a keyboard 16, a cursor control device 17, such as a mouse, trackball, or touchpad; a mass storage device 19, such as a magnetic or optical disk and disk drive; and, a display monitor 18, such as a CRT or LCD (liquid crystal display). The procedure of the present invention, if embodied in software, may be stored in memory 12, in mass storage device 19, or both.

Figure 1B:
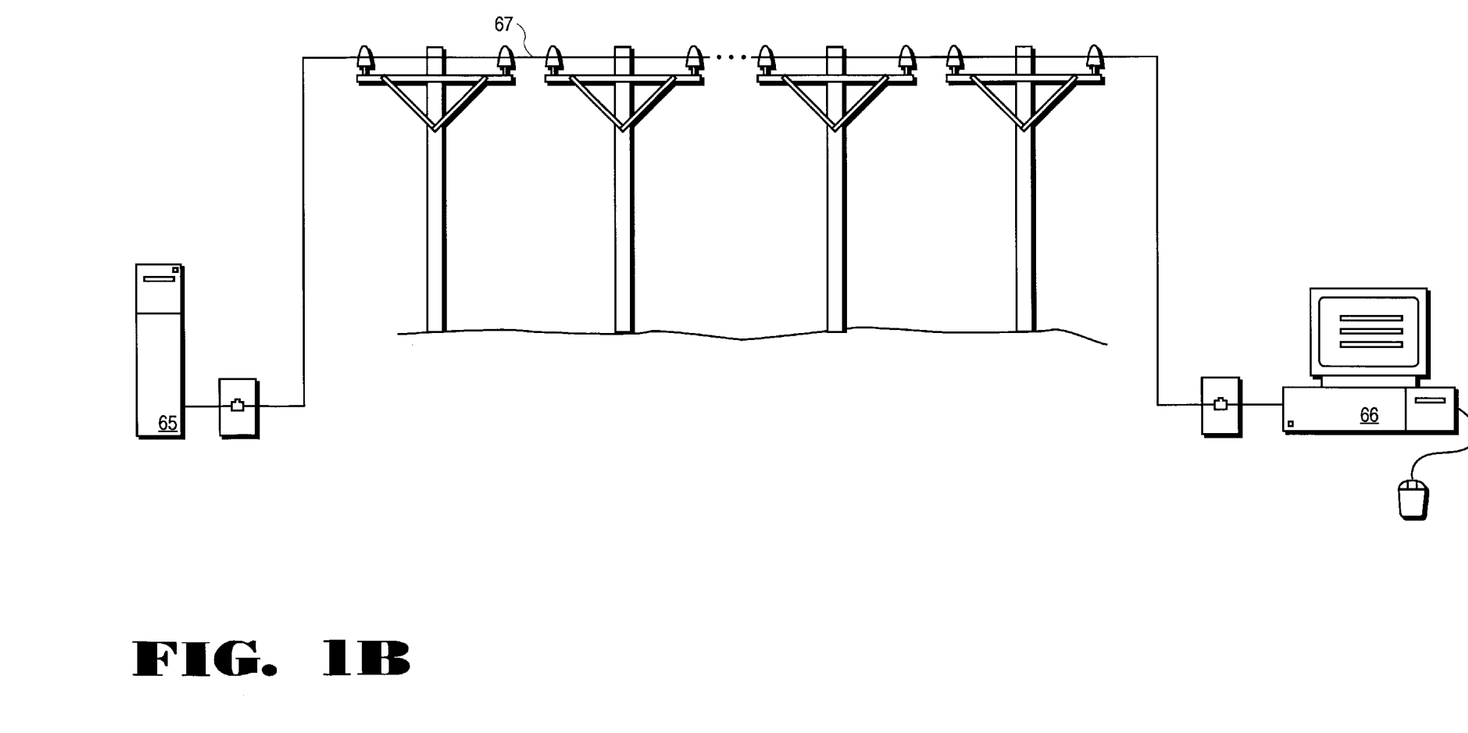
FIG. 1B illustrates a client computer system in communication with a server computer system over a wide area network (WAN).

In one embodiment, the procedure of the present invention can be used to determine and correct for the gamma of display monitor 18. In another embodiment, the procedure may be used to determine and correct for the gamma of a monitor which is outside computer system 10. For example, referring to FIG. 1B, software embodying the present invention may be stored on a server computer system 65 and used to determine the gamma of a monitor associated with a client computer system 66 via an Internet network connection 67. This embodiment is discussed further below.

Figure 2:
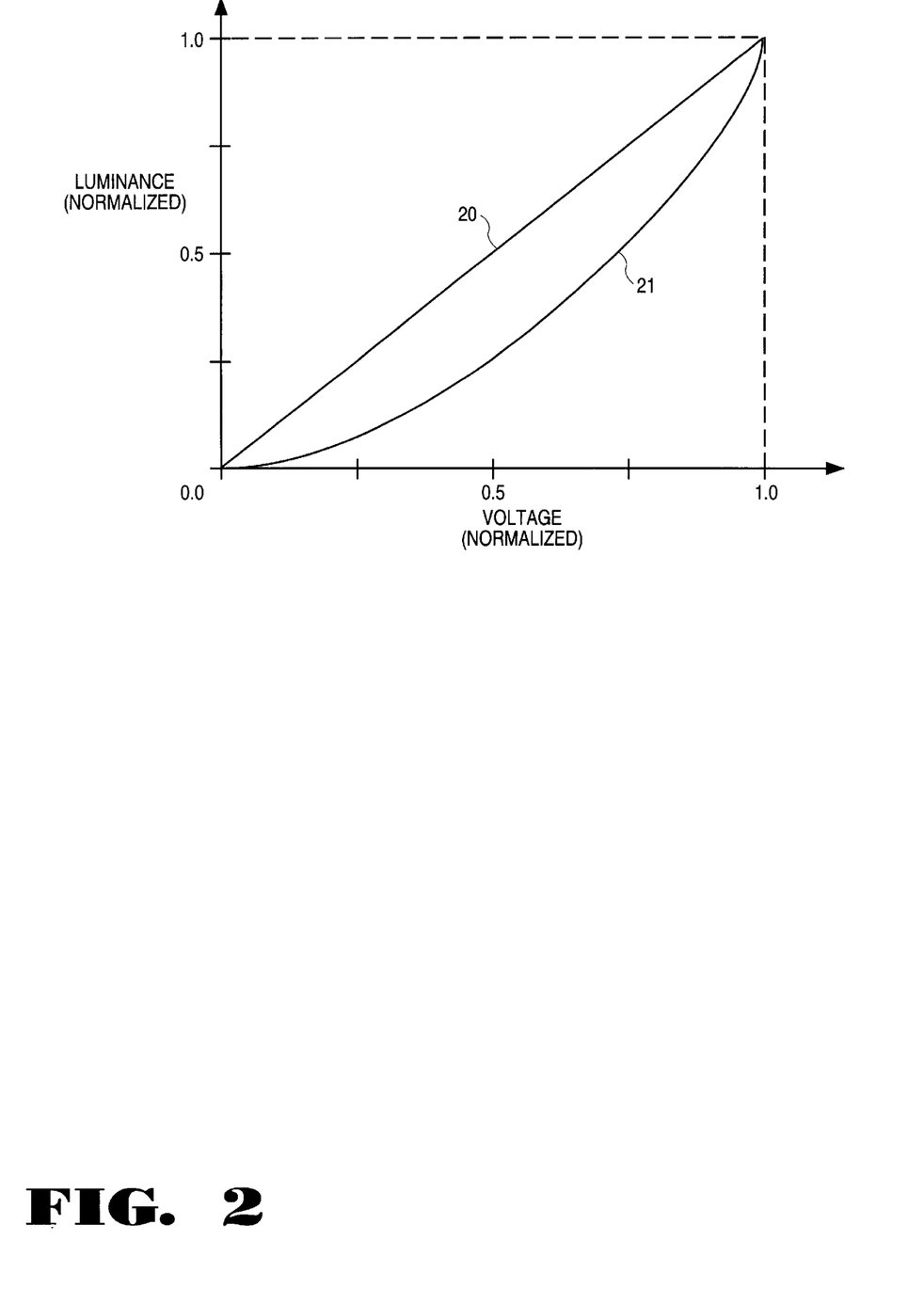
FIG. 2 is a graph of an input/output response of a display device.

The input/output relationship of a CRT is generally characterized by a non-linear relationship between the input voltage and the output light intensity (luminance) for any given pixel. This relationship is approximated by the exponential function: luminance=(voltage)^(gamma), which is illustrated in FIG. 2. In FIG. 2, (input) voltage is listed along the horizontal axis, and (output) luminance is assigned to the vertical access. Voltage and luminance are each normalized to a maximum value of 1.0 in FIG. 2. Line 20 shows a desired relationship between voltage and luminance, in which gamma=1.0. In practice however, the relationship looks more like curve 21, in which gamma is greater than 1.0. In a monitor having an input/output response such as curve 21, images tend to appear darker then they should. Consequently, gamma correction must be performed. In order for gamma correction to be performed, however, the gamma must first be accurately determined. The present invention therefore provides a means for performing easy and accurate determination of a monitor's gamma.

Figure 3A:
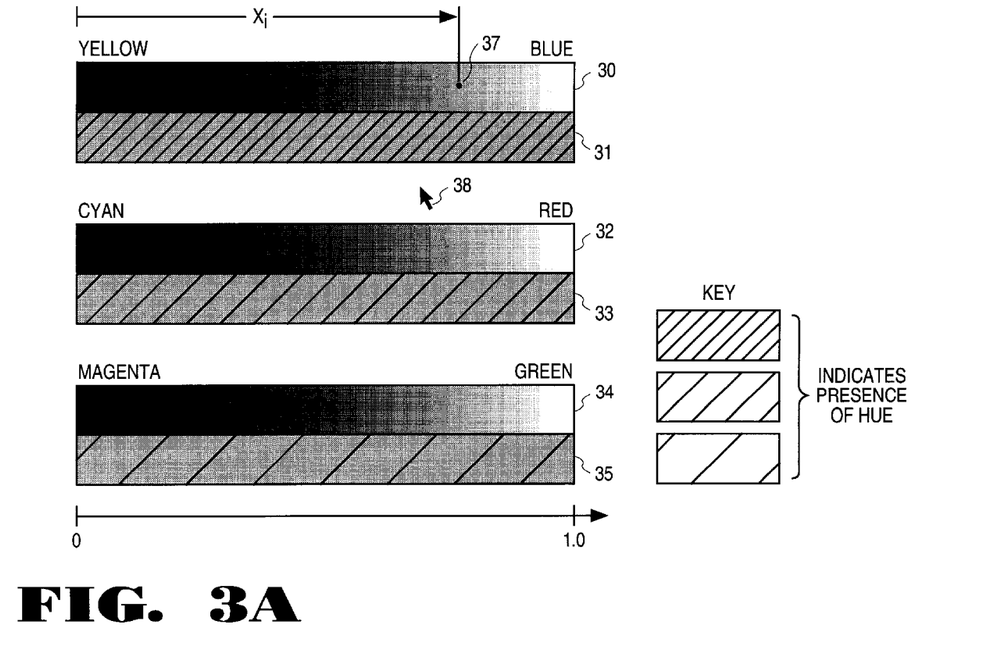
FIG. 3A illustrates color bar images as displayed on a display device, in which gamma correction has not been performed.

In accordance with the present invention, three sets of images are displayed on the display device for which the gamma is to be determined, as illustrated in FIG. 3A. FIG. 3A shows three pairs of "color bar" images, as they are displayed on the display device. One pair of color bars consists of color bars 30 and 31. A second pair of color bars consists of color bars 32 and 33, and the third pair of color bars consists of color bars 34 and 35. In each pair of color bars, a linear ramp of color is displayed in the upper color bar, and a solid (constant) color is displayed in the lower color bar. The user moves the cursor control device to position the cursor 38 within any of the upper-half color bars 30, 32, or 34 at a location at which the color of that color bar matches the color in the corresponding lower-half color bar, 31, 33, or 35, respectively, and then enters a user input (such as clicking a mouse button). This input is then used by the computer system to estimate the gamma of the monitor, and the color bars 30 through 35 are redisplayed accordingly.

The three pairs of color bars 30/31, 32/33, and 34/35 are essentially redundant; that is, only one pair of color bars is needed. However, three pairs may be provided using different color combinations for each pair in order to accommodate variations between people in the ability to discern particular colors. After the color bars are redisplayed based on the estimate of the gamma, then, if the estimate of the gamma was accurate (i.e., the user clicked on precisely the location where the color in the top half matched the color in the bottom half), the bottom-half color bars 31, 33, and 35 will appear to be completely gray (i.e., without any hue), as will be explained below.

Each pair of color bars is designed to allow the comparison of a particular color which has been affected by the monitor's gamma with a color which has not been affected as much by the monitor's gamma. Display devices generally use a blend of three basic colors to generate all colors, such as red-green-blue (RGB). Thus, each pair of color bars allows the comparison to be made for a different basic color, such as red, green, or blue. Note that, in many display devices, voltage is specified in a range of 0 to 255. Hence, each pixel of color bar 30 has constant red and green intensity values equal to 128 on a scale from 0 to 255. However, the blue value varies spatially in a linear fashion along the horizontal (x) axis from an intensity of 0 at the far left to an intensity of 255 at the far right. The displayed effect is a ramp of color in the upper-half color bar 30. This approach is also used to generate top-half color bars 32 and 34, except that a different basic color (e.g., red or green) is used in each color bar as the color that is spatially "ramped".

In the bottom-half color bar, 31 each pixel is also assigned red and green values of 128. However, the blue values for the pixels alternate in a checkerboard fashion between values of 0 and values of 255. FIG. 4B illustrates a checkerboard pattern for a group of pixels 41 through 56 within bottom-half color bar 31. In FIG. 4B, pixels 42, 44, 45, 47, 50, 52, 53, and 54 each have a blue intensity value of 0, while pixels 41, 43, 46, 48, 49, 51, 54, and 56 each have a blue intensity value of 255. The values of 0 and 255 are chosen because neither 0 nor 255 experiences the gamma effect significantly. Furthermore, the effect of the checkerboard pattern is that, when viewed from typical viewing distances, the user sees only the average of values 0 and 255; that is, the user sees a color appearing to have a blue intensity of 128. Thus, while the upper half-color bar 30 is completely affected by the gamma, the lower-half color bar is not significantly effected by the gamma. This approach is also used to generate bottom-half color bars 31, 33, and 35, except that a different basic color (e.g., red or green) is used in each color bar as the color that is displayed using the checkerboard pattern.

The location at which the color of the upper-half color bar 30 matches the color of the lower-half color bar 31, therefore, is the location at which the gamma-affected color bar 30 is halfway between minimum and maximum brightness. The horizontal (x) coordinate $x_i$ at which the user clicks is converted to a normalized position X, which can range from a minimum value of 0 at the far left edge of the color bar 30 to a maximum value of 1.0 at the far right edge of the color bar 30. The estimate of the monitor's gamma, $gamma_{EST}$, is then determined according to equation (1).

$$gamma_{EST}=(\log_{10}0.5)/(\log_{10}X) \quad (1)$$

Figure 4A:
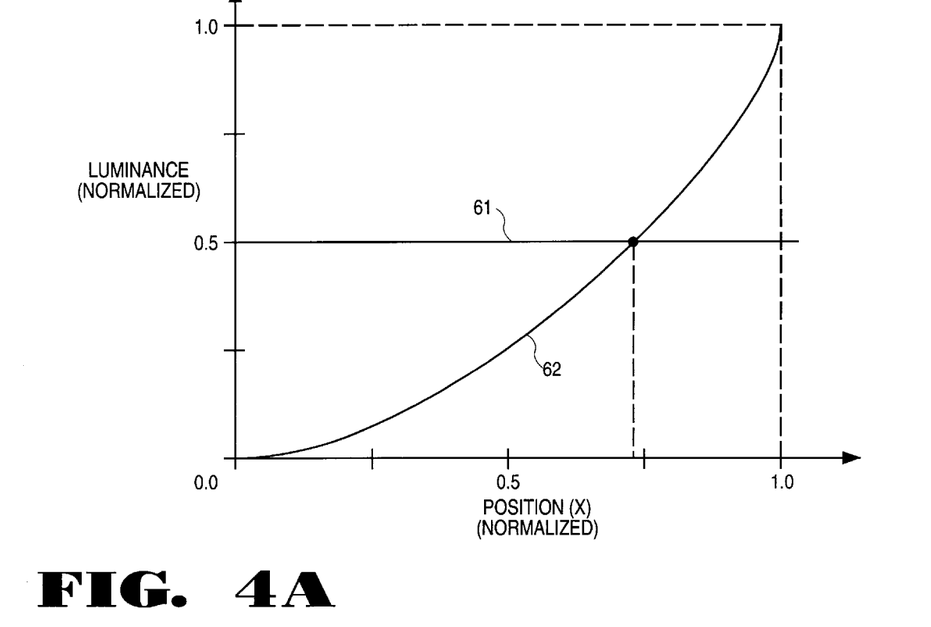
FIG. 4A is a graph showing the input/output response curves associated with two corresponding color bars of FIG. 3A.
Figure 4B:
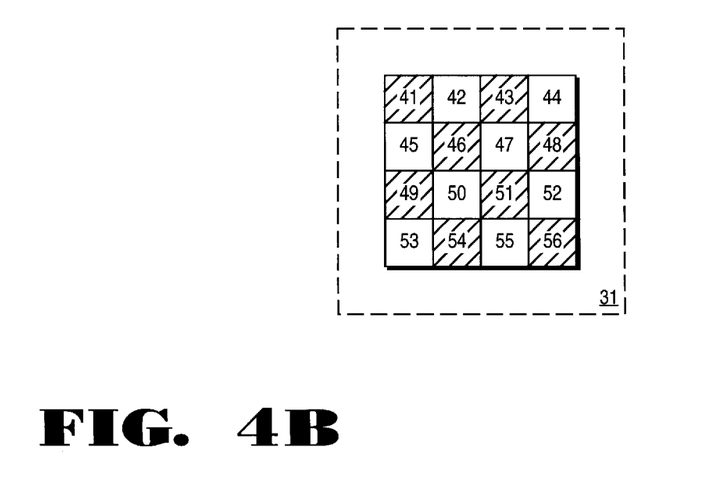
FIG. 4B illustrates several pixels of a display device displayed in a checkerboard pattern.

Thus, referring now to FIG. 4A, curve 62 approximates the input/output response for any of the upper-half color bars 30, 32, or 34, while line 61 approximates the input/output response for any of the lower-half color bars 31, 33, or 35. By clicking on a location within one of the upper-half color bars, the user inputs the coordinate $x_i$ at which the two curves 61 and 62 intersect. The coordinate $x_i$ is then normalized to a value X, which is applied to the equation (1) to determine the estimate of the monitor's gamma, $gamma_{EST}$.

Once the estimate $gamma_{EST}$ is computed, the color bar images are corrected and redisplayed to give the user real-time feed back. Specifically, instead of sending an input voltage V to the monitor for a given pixel, the pixel is assigned a new voltage $V_{NEW}$ according to equation (2).

$$V_{NEW}=255(V/255)^{(1/gamma_{EST})} \quad (2)$$

Figure 3B:
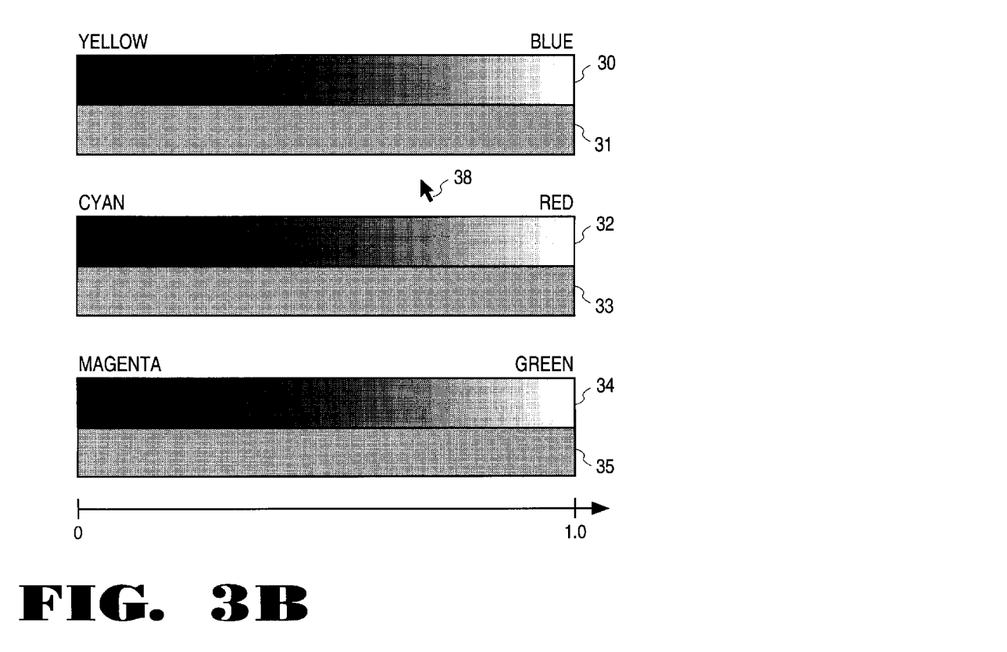
FIG. 3B illustrates color bar images as displayed on a display device after gamma determination and correction has been performed.

If the gamma estimate was accurate, the images will be redisplayed such that each of the lower half color bars 31, 33, and 35 is completely gray (i.e., without hue). The reason for this effect is that, when the gamma is effectively equal to 1.0, the overall intensities of red, green, and blue are equal in the lower-half color bars, yielding an overall color of gray. If the estimate is not accurate, then there will not be equal intensities of red, green, and blue applied to each pixel of the lower-half color bars, and the user will therefore perceive the presence of hue (non-gray color) in at least one of the lower-half color bars. FIG. 3B illustrates the three pairs of color bars after the gamma has been accurately estimated and the images have been redisplayed accordingly, such that each of the lower-half color bars 31, 33 and 35 is without hue.

The use of color in the color bar images allows an easier comparison and a more accurate estimate of the gamma to be made than could be obtained using only degrees of black-and-white. The presence of any hue remaining in any of the bottom-half color bars after the images are redisplayed will indicate to the user that the gamma has not yet been precisely determined. Accordingly, the user is allowed to click again (and as many more times as desired) to make a more accurate determination.

Note that in the preferred embodiment, gamma determination is performed simultaneously with respect to all three basic colors (e.g., red, green and blue). However, the user may be provided with an option (which may be selected as a menu item or a "soft button", for example) to perform gamma estimation and correction independently for each of these colors. In that case, the user would click on a point in each of the top-half color bars 30, 32, and 34 of FIG. 3A.

Figure 5:
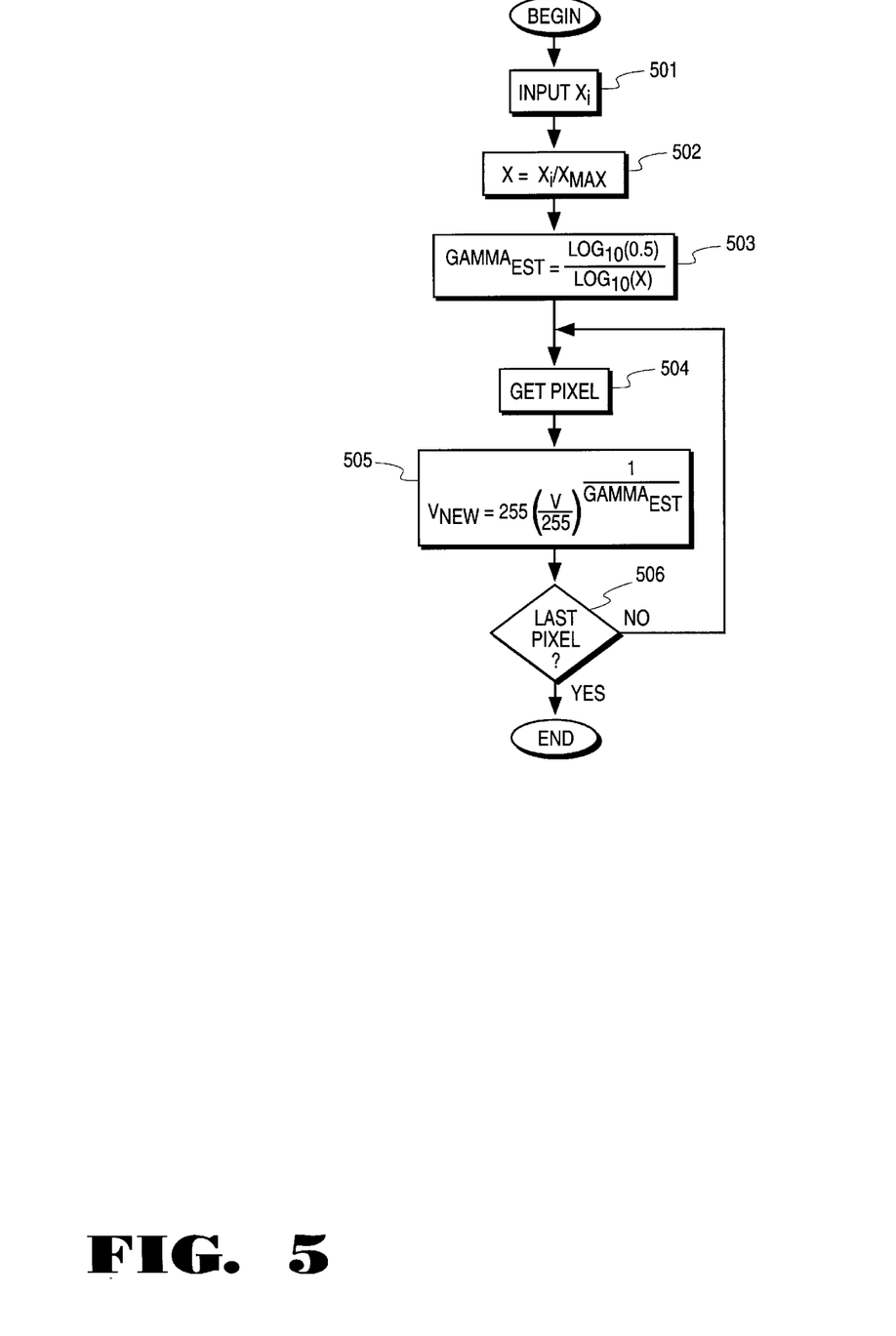
FIG. 5 is a flow diagram illustrating a procedure for determining and correcting for a gamma of a display device using the color bar images of FIGS. 3A and 3B.

FIG. 5 illustrates a procedure for determining and correcting for the gamma of a display device using the technique described above. Initially, the user clicks on a location $x_i$ on one of the top-half color bars to specify the horizontal (x) coordinate at which the color in the top-half color bar matches the color in the bottom half color bar (step 501). This coordinate is then normalized relative to the maximum coordinate of the pair of color bars (step 502). Next, an estimate of gamma, $gamma_{EST}$, is determined according to equation (1), above (step 503). Gamma correction may then be performed for each pixel according to equation (2) above (steps 504, 505, and 506).

In one embodiment, the present invention can be implemented as a World Wide Web page generated by a server computer system, which can be accessed using any Web browser software (e.g., Netscape™) running on a client computer system. Referring again to FIG. 1B, in such an embodiment, the procedure of the present invention is embodied in software stored in the server computer system 65 and is used to determine the gamma of a monitor associated with a client computer system 66.

Figure 6:
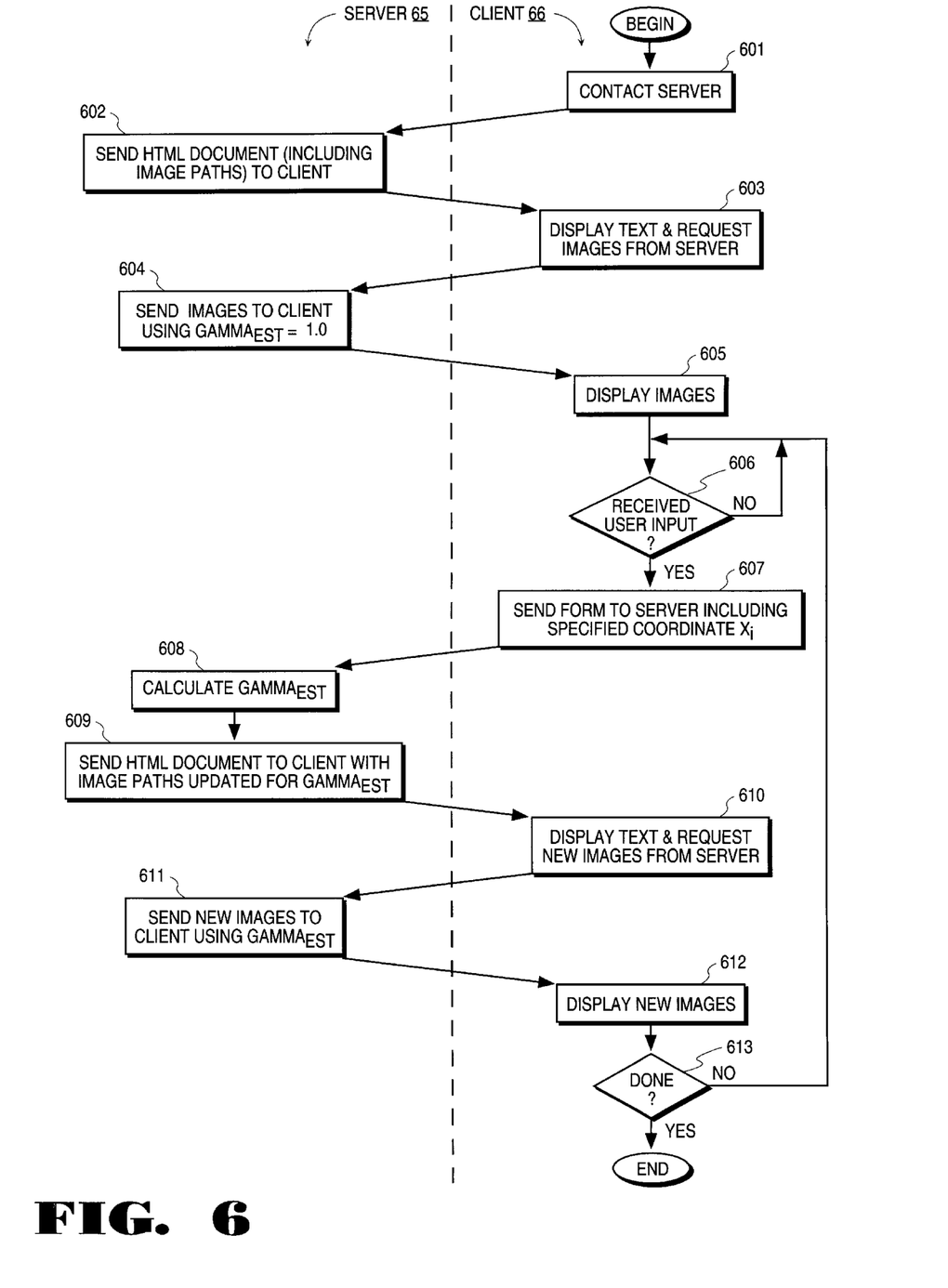
FIG. 6 is a flow diagram for performing gamma determination and correction in a client-server environment over a wide area network (WAN).

FIG. 6 illustrates a procedure for implementing the present invention using a World Wide Web page. Initially, the client system 66 makes contact with the server 65 using a Web browser (step 601). In response to receiving an appropriate URL (uniform resource locator) or an equivalent logical address, the server system 65 sends an HTML (hypertext mark-up language) document to the client system (step 602). The server system 65 stores program code and files for generating the color bar images 31 through 35 illustrated in FIGS. 3A and 3B. In one embodiment, the software used within the server system 65 to implement the present invention is an interpreted scripting language, such as Perl. However, other programming languages may also be used.

Included in the HTML document that is sent to the client system 66 are image paths which indicate the location of files that are stored in the server system. These files define the color bar images. For example, an HTML instruction which might be included in the initial HTML document for generating a particular pair of color bar is:

<INPUT TYPE="image" NAME="gamma" SRC= "ramps/gammagif.cgi/magenta_green.gif, 1">. This instruction designates a program (which may be written in Perl) loaded on the server system 65. The specified image path in this instruction is "ramps/gammagif.cgi/ magenta_green.gif, 1" The value "1" in the image path indicates that the image which will be generated from this file is not gamma corrected.

The HTML document causes the client system 66 to display appropriate text to instruct and to prompt a response from the user of the client system 66 (step 603). In addition, the client system 66 transmits a request to the server system 65 to transmit the color bar images specified in the HTML document, as specified in the sample instruction above (step 603). In response, the server system 65 transmits the requested color bar images, which correspond to a gamma value of 1.0 (step 604). In other words, the transmitted images are not gamma corrected. Once the client system receives the images, the client system displays the images as shown in FIG. 3A and waits for a user input (steps 605 and 606). When the user clicks on a location in one of the top-half color bars 30, 32, or 34, the (horizontal) coordinate $x_i$ of that location is then transmitted to the server system 65 using an HTML form (step 607). In response, the server system 65 computes the estimate of the gamma, $gamma_{EST}$, according to equation (1) and FIG. 5 (step 608).

After calculating the estimate of the gamma, the server system 65 then transmits a new HTML document to the client system 66 which includes new image paths based on the estimated gamma. For example, if $gamma_{EST}$ were computed to be 1.6, the server system 65, may send the following HTML instruction relating to a particular pair of color bars:

<INPUT TYPE="image" NAME="gamma" SRC= "ramps/gammagif.cgi/magenta_green.gif, 1.6">. Note that in this instruction, "1" has been replaced by "1.6". In response, the client system 66 displays appropriate text and requests the updated images from the server 65 (step 610).

In response to the request from the client system 66, the server system 65 transmits updated image files for redisplaying the color bars of FIGS. 3A and 3B to the client system 66 (step 611). In one embodiment of the present invention, the server 65 stores various separate image files, each of which is adjusted for a different value (estimate) of gamma. Accordingly, in response to the request from the client system 66 (in step 610), the server 65 can select and transmit the image file which most closely corresponds to the gamma estimate. In an alternative embodiment, the server system 65 may store a single image file and, in response to the client's request, modify the file according to the gamma estimate and provide the modified image file to the client system 66.

The client system 66 displays the updated (gamma-corrected) color bar images once it receives the images from the server system 65 (step 612). As mentioned above, if the estimate of gamma was accurate, the bottom-half color bars 31, 33, and 35, when redisplayed, will appear to be completely gray (i.e., without hue). The user will therefore be prompted to click on another location in any of the top-half color bars 30, 32, or 34 if he sees any hue (i.e., any non-gray color) in any of the bottom-half color bars 31, 33, or 35. Hence, the client system 66 will wait for another user input specifying a location $x_i$, after displaying the gamma-corrected color bars, unless a different user input is received indicating the user was satisfied with the gamma estimate (step 613).

Once an accurate estimate (according to the user's perception) of the gamma is determined, the estimate may be used in any manner desired. For example, the estimate of the gamma can be downloaded to the client system 66, where application software may use the estimate to provide accurate gamma correction. In addition, or alternatively, the server system may simply store the estimate for future use in connection with that client system 66.

Thus, the present invention makes use of color and real-time feedback in order to allow the gamma of a monitor to be easily and accurately estimated. As further described above, the present invention can be implemented using a World Wide Web page as a user interface. Although the present invention is described herein with reference to specific embodiments, many variations and modifications thereof will readily occur to those of ordinary skill in the art. Accordingly, all such variations and modifications are included within the scope of the present invention as defined by the claims which follow.

What is claimed is:

1. A method of enabling gamma correction to be performed for a display device, the display device having an input/output response characterized by a gamma, the display device capable of displaying color images using at least three color components, the method comprising the steps of:

causing the display device to display a first image, the first image characterized by a substantially constant intensity for each of a first two color components of the three color components, the first image further characterized by a substantially linear scale of intensity along a coordinate axis for a third color component of the three color components;

causing the display device to display a second image, the second image characterized by a substantially constant intensity for each of the first two color components, the second image further characterized by a substantially constant average intensity for the third color component, wherein the second image has an overall color;

receiving a user input specifying a location on the first image at which the first image appears to match the overall color of the second image; and determining an estimate of the gamma based on the location on the first image specified by the user input.

2. The method of claim 1, further comprising the step of causing the display device to display a third image based on the correction value, such that the overall color of the third image is an indication of the gamma for the display device.

3. The method of claim 2, wherein, in the step of causing the display device to display the third image, the third image has no hue if the estimate of the gamma is substantially equal to the gamma.

4. The method of claim 1, further comprising the step of modifying the input/output response of the display device based on the estimate of the gamma, such that the display device has an effective gamma substantially equal to one (1).

5. The method of claim 1, wherein the step of causing the display device to display the second image comprises the step of generating the substantially constant average intensity of the third color component such that the third color is substantially unaffected by the gamma.

6. The method of claim 5, wherein the step of causing the display device to display the second image further comprises the step of assigning the pixels in the second image intensities which alternate by pixel between a first intensity value and a second intensity value.

7. The method of claim 1, further comprising determining a correction value based on the estimate of the gamma.

8. In a server system in communication with a client system over a geographically distributed network, the client system including a display device, a method of performing gamma correction for the display device, the method comprising the steps of:

transmitting first information from the server system to the client system, the first information to be used by the client system to cause a first image to be displayed by the display device, the first image having a substantially constant intensity for each of a first two colors, the first image further having a substantially linear scale of intensity along a coordinate axis for a third color;

the first information further to be used by the client system to cause a second image to be displayed by the display device, the second image having a substantially constant intensity for each of the first two colors, the second image further having a substantially constant average intensity for the third color, the second image further having an overall color;

the first information further to be used by the client system to cause the client system to receive a user input specifying a location on the first image at which the first image appears to match the overall color of the second image;

the first information further to be used by the client system to cause the client system to transmit to the server system information indicating the location specified by the user input;

determining an estimate of a gamma of the display device based on the information indicating the location specified by the user input;

determining a correction value based on the estimate of the gamma;

transmitting second information from the server system to the client system, the second information to be used by the client system to cause the display device to display a third image in place of the second image based on the correction value, the third image having an overall color, wherein the overall color of the third image is representative of a corrected gamma of the display device, such that the overall color of the third image is without hue if the estimate of the gamma is substantially equal to the gamma.

9. The method of claim 8, wherein the first information and the second information are included in a hypertext document.

10. The method of claim 8, wherein the first image, the second image, and the third image are generated as part of at least one World Wide Web page.

11. A program storage device readable by a machine, the program storage device tangibly embodying sequences of instructions executable by the machine to perform method steps for providing gamma correction for a display device coupled to the machine, the method steps comprising:

causing the display device to display a first image, the first image having a substantially constant intensity for each of a first two colors, the first image having a substantially linear scale of intensity for a third color with respect to position on the display device;

causing the display device to display a second image, the second image having a substantially constant intensity for each of the first two colors and having a substantially constant average intensity for the third color, wherein the second image has an overall color;

receiving a user input specifying a location on the first image at which the first image is perceived by a user to match the overall color of the second image;

determining an estimate of the gamma based on the location on the first image specified by the user input; and determining a correction value based on the estimate of the gamma.

12. The program storage device of claim 11, the method steps further comprising the step of causing the display device to redisplay the second image based on the correction value, such that the second image indicates a degree of correctness of the gamma.

13. The program storage device of claim 12, wherein the step of causing the display device to redisplay the second image comprises the step of causing the display device to redisplay the second image such that the second image is without hue if the estimate of the gamma is equal to the gamma.

14. The program storage device of claim 11, wherein the step of causing the display device to display the second image comprises the step of determining the substantially constant average intensity of the third color to be such that the third color is substantially unaffected by the gamma.

15. The program storage device of claim 14, wherein the second image has a plurality of pixels, wherein the step of causing the display device to display the second image further comprises the step of assigning the pixels in the second image intensities which alternate by pixel between a first intensity value and a second intensity value.

16. In a computer system having a display device, a method of performing gamma correction for the display device, the display device having an input/output response substantially characterized by the equation $$\text{luminance} = (\text{voltage})^{\wedge}(\text{gamma}),$$

the display device capable of displaying color images using at least three color components, the method comprising the steps of:

causing the display device to display a first image, the first image characterized by a substantially constant intensity for each of a first two color components of the three color components, the first image further characterized by a substantially linear scale of intensity along a coordinate axis for a third color component of the three color components;

causing the display device to display a second image, the second image characterized by a substantially constant intensity for each of the first two color components, the second image further characterized by a substantially constant average intensity for the third color component, wherein the second image has an overall color, such that the third color is substantially unaffected by the gamma;

receiving a user input specifying a location on the first image at which the first image appears to match the overall color of the second image;

determining an estimate of the gamma based on the location on the first image specified by the user input;

determining a correction value based on the estimate of the gamma; and causing the display device to display a third image based on the correction value, such that the overall color of the third image is an indication of the gamma for the display device, wherein the third image has no hue if the estimate of the gamma is substantially equal to the gamma.

17. An apparatus for performing gamma correction for a display device, the display device having an input/output response characterized by a gamma, the display device capable of displaying color images using at least three color components, the apparatus comprising:

means for causing the display device to display a first image, the first image characterized by a substantially constant intensity for each of a first two color components of the three color components, the first image further characterized by a substantially linear scale of intensity along a coordinate axis for a third color component of the three color components;

means for causing the display device to display a second image, the second image characterized by a substantially constant intensity for each of the first two color components, the second image further characterized by a substantially constant average intensity for the third color component, wherein the second image has an overall color;

means for receiving a user input specifying a location on the first image at which the first image appears to match the overall color of the second image;

means for determining an estimate of the gamma based on the location on the first image specified by the user input; and means for determining a correction value based on the estimate of the gamma.

18. The apparatus of claim 17, further comprising means for causing the display device to display a third image based on the correction value, such that the overall color of the third image is an indication of the gamma for the display device.

19. The apparatus of claim 18, wherein the means for causing the display device to display the third image comprises means for causing the display device to display the third image with no hue if the estimate of the gamma is substantially equal to the gamma.

20. The apparatus of claim 17, further comprising means for modifying the input/output response of the display device based on the estimate of the gamma, such that the display device has an effective gamma substantially equal to one (1).

21. The apparatus of claim 17, wherein the means for causing the display device to display the second image comprises means for generating the substantially constant average intensity of the third color component such that the third color is substantially unaffected by the gamma.

22. The apparatus of claim 21, wherein the means for causing the display device to display the second image further comprises means for assigning the pixels in the second image intensities which alternate by pixel between a first intensity value and a second intensity value.

* * * * *